United States Patent [19] [11] 4,384,055
Okuda et al. [45] May 17, 1983

[54] HARD VINYL CHLORIDE RESIN COMPOSITION FOR INFORMATION SIGNAL RECORDING MEDIA

[75] Inventors: Takao Okuda, Yokohama; Nobuhide Hada, Kamakura, both of Japan

[73] Assignee: Nippon Zeon Co. Ltd., Tokyo, Japan

[21] Appl. No.: 302,849

[22] Filed: Sep. 16, 1981

[30] Foreign Application Priority Data

Sep. 16, 1980 [JP] Japan .................................. 55-128220

[51] Int. Cl.³ .......................... C08K 3/04; C08L 27/06
[52] U.S. Cl. ..................................... 523/174; 523/181; 524/495; 524/496; 524/527; 524/528; 524/567; 524/569; 524/109
[58] Field of Search ................. 523/174, 181; 524/495, 524/496, 527, 528, 567, 569

[56] References Cited

U.S. PATENT DOCUMENTS

| | | | |
|---|---|---|---|
| 4,066,576 | 1/1978 | Bork et al. | 524/495 |
| 4,097,656 | 6/1978 | Dany et al. | 524/495 |
| 4,151,132 | 4/1979 | Khanna | 358/129 |
| 4,228,050 | 10/1980 | Martin et al. | 358/128.5 |
| 4,299,736 | 11/1981 | Datta | 358/129 |

Primary Examiner—Ronald W. Griffin
Attorney, Agent, or Firm—Sherman & Shalloway

[57] ABSTRACT

A hard vinyl chloride resin composition for information signal recording media, said composition consisting essentially of (A) 100 parts by weight of a copolymer having a specific viscosity of 0.16 to 0.31 and composed of 75 to 99% by weight of vinyl chloride, 1 to 10% by weight of ethylene and 0 to 15% by weight of another monomer copolymerizable with said monomers, and/or a polymer mixture having a specific viscosity of 0.16 to 0.31 and composed of at least two polymers selected so that the proportions of monomer components are the same as above, and (B) 15 to 30 parts by weight of carbon black having an oil absorption of 300 to 400 ml/100g and a surface area of at least 900 m²/g.

3 Claims, No Drawings

HARD VINYL CHLORIDE RESIN COMPOSITION FOR INFORMATION SIGNAL RECORDING MEDIA

This invention relates to a vinyl chloride resin composition for information signal recording media which comprises a specified vinyl chloride polymer and a specified carbon black. More specifically, it pertains to a hard vinyl chloride resin composition capable of giving an information signal recording medium which has a high softening temperature, high electric conductivity, excellent carbon black dispersibility, excellent dynamic heat stability and a good surface texture.

It has already been the wide industrial practice to obtain conductive molded articles by incorporating a conductive material such as conductive carbon or a fine metallic powder into a thermoplastic polymer such as a vinyl chloride polymer, a polyolefin, polystyrene or an ethylene/vinyl acetate copolymer, and molding the mixture at high temperatures. These conductive molded articles are used widely in corona discharge-preventing materials for high-voltage transmission cables and wires, antistatic packaging materials for IC products, electric precipitator covers, antistatic sheets, antistatic carpets, computers, antistatic floor materials for use in an operation room, etc., panel heaters for floor heating, other electrical component parts, and precision instruments. Among these thermoplastic polymers used in these industrial applications, the vinyl chloride resins (e.g., a homopolymer of vinyl chloride, or a copolymer of vinyl chloride and vinyl acetate), has acquired an important status in the art because of their ease of processability, a variety of processing methods available, and their good properties and relatively low costs. They are generally used particularly in soft resin formulations. In soft formulations of these vinyl chloride polymers, a large quantity of a plasticizer is used, and therefore friction between carbon black particles and between the carbon black and the polymer at the time of kneading is reduced and heat generation caused by the friction can be ignored. Furthermore, since the flowability of the kneaded mixture is good, no problem arises in processing. Also, the properties of the product such as strength scarcely give rise to a problem. In hard resin formulations, too, conductivity required for static prevention is sufficient when the volume resistivity is about $10^7$ ohms, and therefore, the amount of carbon black to be incorporated can be small. Thus, when a vinyl chloride polymer is used in hard resin formulations, no particular problem arises in processability of the composition or the properties of the molded articles.

In recent years, there has been an increasing demand for hard information signal recording media (to be referred to simply as recording media) which have higher conductivity (lower volume resistivity) and are free from minute non-uniformity in conduction in the field of products for use in information recording. To meet this requirement, it is necessary to incorporate a larger amount of a conductive material such as carbon black and disperse it more uniformly, thereby imparting better conductivity than before. The decrease of processability as a result of incorporating carbon black is a formidable problem. Specifically, the resin composition generates a large amount of heat during processing, and in an extreme case, undergoes decomposition. In particular, a molded article which is to be further processed, such as pellets, has poor heat stability because it has experienced heat-treatment during the primary molding. It is very likely, therefore, to decompose during the secondary processing. Furthermore, the addition of a large amount of carbon black increases the melt viscosity of the composition, and in extrusion processing for example, the amount of the extrudate per unit time decreases to reduce productivity. In an extreme case, extrusion becomes impossible. Or such a composition gives a recording medium having a bad surface texture which debases its merchandise value. Thus, in order to reduce heat generation or friction, a slip agent is frequently used. The amount of the slip agent has naturally to be large, and masses of carbon particles tend to remain in the resulting molded article. The carbon black is not uniformly dispersed, and this deteriorates the electrical properties of the product. Furthermore, the product has a low softening temperature and a poor surface texture, and cannot find practical applications.

It is an object of this invention, therefore, to provide a hard vinyl chloride resin composition capable of giving an information signal recording medium which has a high softening temperature (at least 45° C.), high conductivity (corresponding to a volume resistivity of not more than 50 ohms-cm), excellent carbon black dispersibility, excellent dynamic heat stability, and a good surface texture.

The above object is achieved in accordance with this invention by a hard vinyl chloride resin composition for information signal recording media, said composition comprising (A) 100 parts by weight of a copolymer having a specific viscosity of 0.16 to 0.31 and composed of 75 to 99% by weight of vinyl chloride, 1 to 10% by weight of ethylene and 0 and 15% by weight of another monomer copolymerizable with said monomers, and/or a polymer mixture having a specific viscosity of 0.16 to 0.31 and composed of at least two polymers selected so that the proportions of monomer components are the same as above, and (B) 15 to 30 parts by weight of carbon black having an oil absorption of 300 to 400 ml/100 g and a surface area of at least 900 m$^2$/g.

In the present application, the specific viscosities of copolymers and polymer mixtures are measured by JIS K-6721; the oil absorption of carbon black, by JIS K-6221; and the specific surface area of carbon black, by ASTM D3037-73.

Examples of the other monomer copolymerizable with vinyl chloride and ethylene include olefins such as propylene, vinyl esters of fatty acids having not more than 3 carbon atoms such as vinyl acetate, unsaturated acids such as acrylic acid, methacrylic acid, maleic acid and fumaric acid, esters of unsaturated acids such as methyl acrylate, unsaturated acid anhydrides such as maleic anhydride, nitrile compounds such as acrylonitrile, alkyl vinyl ethers such as methyl vinyl ether, and vinylidene compounds such as vinylidene chloride.

In the present invention, a mixture of at least two polymers may be used instead of the above copolymer. The two or more polymers are selected such that the polymer mixture consists of 75 to 99% by weight of vinyl chloride, 1 to 10% by weight of ethylene and 0 to 15% by weight of the other monomer. An example of such a polymer mixture is a mixture of a vinyl chloride homopolymer (1) or a copolymer (1') of vinyl chloride and another monomer copolymerizable with it (such monomers as exemplified above for use in the copolymer in accordance with this invention), and a copolymer (2) of ethylene and a monomer copolymerizable with it (such as vinyl chloride, olefins other than ethylene, vinyl esters, unsaturated acids, derivatives of the unsaturated acids, acrylonitrile, vinylidene chloride). A mixture of the vinyl chloride homopolymer (1) and the vinyl chloride/ethylene copolymer (2) is an especially preferred example of the polymer mixture.

The proportion of ethylene in the copolymer or polymer mixture used in this invention is 1 to 10% by weight, preferably 2 to 8% by weight. If the proportion of ethylene is less than 1% by weight, it is difficult to obtain a recording medium having uniform carbon black dispersion and good conductivity. Since the melt viscosity of the composition is high, its processing is difficult. Moreover, heat generation during processing is so great that the composition is likely to decompose. If the proportion of ethylene exceeds 10% by weight, a polymer is substantially difficult to obtain. Moreover, any recording medium obtained has too low a softening temperature and undergoes deformation by slight changes in temperature.

The proportion of the other monomer in the copolymer or polymer mixture used in this invention is 0 to 15% by weight, preferably 0 to 5% by weight. If it exceeds 15% by weight, one or both of the uniform dispersibility of carbon black and thermal stability during processing become poor. Vinyl chloride is used in a proportion of 75 to 99% by weight, preferably 87 to 98% by weight, depending upon the proportions of the other components described above.

The copolymer or polymer mixture used in the invention should have a specific viscosity of 0.16 to 0.31. The specific viscosity is associated with the degree of polymerization of the polymer. A recording medium molded from the copolymer or the polymer mixture having a specific viscosity of less than 0.16 has very low strength. When the copolymer or polymer mixture has a specific viscosity of more than 0.31, the melt viscosity of the composition is so high that a recording medium is difficult to mold from it and dispersion of carbon black becomes non-uniform.

The carbon black used in this invention is special. It should have an oil absorption of 300 to 400 ml/100 g and a surface area of at least 900 m$^2$/g, preferably 900 to 1,300 m$^2$/g. The oil absorption is measured in accordance with JIS K-6221, and the surface area is measured in accordance with ASTM D3037-73. Use of a carbon black having an oil absorption of less than 300 ml/100 g of a surface area of less than 900 m$^2$/g cannot give a recording medium having a volume resistivity of not more than 50 ohms-cm. From the viewpoint of processability, particularly flowing properties, the surface area preferably should not exceed 1,300 m$^2$/g. If the oil absorption exceeds 400 ml/100 g, the melt viscosity of the composition is high and a large amount of heat is generated to cause processing difficulty. Moreover, the dispersion of carbon black tends to become non-uniform. From the viewpoint of the processability of the resin composition and the strength of the resulting recording medium, the carbon black is preferably of such a type as to give high conductivity in a minimum amount. An example of such carbon black is conductive furnace black (e.g., Ketjen Black EC, a trademark for a product of Akzo Chemie).

Carbon black should be added in an amount of 15 to 30 parts by weight per 100 parts by weight of the copolymer or polymer mixture. If the amount of the carbon black is less than 15 parts by weight, the volume resistivity of the product cannot be adjusted to not more than 50 ohms-cm. If it exceeds 30 parts by weight, the melt viscosity of the composition is high, and heat generation during processing is great. Moreover, the properties of the resulting recording medium are inferior. Hence, amounts outside the specified range are undesirable.

The composition of this invention may contain 0 to 20 parts by weight, preferably 2 to 10 parts by weight, of a slip agent and 0 to 5 parts of weight of a plasticizer per 100 parts by weight of the copolymer or the polymer mixture. If the amount of the slip agent exceeds 20 parts by weight, dispersion of carbon black in the recording medium is non-uniform. If the amount of the plasticizer exceeds 5 parts by weight, the softening temperature of the recording medium falls below 45° C.

Stabilizers generally used for vinyl chloride resins are also added to the composition. If required, lubricants of the silicone and fluorine types may be incorporated in the composition. The amount of the stabilizer is 1 to 10 parts by weight, preferably 2 to 5 parts by weight, and the amount of the lubricant is 0 to 5 parts by weight, preferably 0.5 to 2 parts by weight, both per 100 parts by weight of the copolymer or the polymer mixture.

In order to improve the processability of the composition and the mechanical properties, particularly brittleness, and electrical properties of the resulting recording medium, the composition of this invention may also contain an elasticity-imparting polymer such as an acrylonitrile-butadiene type rubber, thermoplastic polyurethane, an ethylene/vinyl acetate copolymer, a vinyl chloride-grafted ethylene/vinyl acetate copolymer, a methyl methacrylate/butadiene/styrene type resin, and a chlorinated polyolefin, or a processability-improving polymer such as a copolymer composed mainly of methyl methacrylate. The amount of such an elasticity-imparting polymer or a processability-improving polymer is 0 to 30 parts by weight per 100 parts by weight of the copolymer or the polymer mixture.

Carbon black and the various additives may be incorporated in the copolymer or the polymer mixture during processing by an ordinary ribbon blender, Banbury mixer or high-speed agitator. Or they may be charged together with the monomers into the polymerization reactor at the time of producing the copolymer. Alternatively, they may also be added to a slurry of the copolymer or the polymer mixture before drying.

The composition of this invention is molded by usual methods into various information signal recording media such as video discs, digital audiodiscs and computer discs, etc.

The following Examples illustrate the present invention more specifically.

All parts of the polymers and additives are by weight.

The various properties in these examples were measured by the following methods.

Melt viscosity

Measured by using a Koka-type flow tester. The melt viscosity of a square pellet each side measuring 5 mm was measured at a temperature of 160° C. and a shear speed of $10^3$ sec$^{-1}$ by means of a nozzle having a length of 10 mm and a diameter of 1 mm.

Dynamic heat stability

Measured by a Brabender plastograph. A square pellel each side measuring 5 mm was charged, pre-heated for 3 minutes, and rotated under the following conditions.
   Chamber capacity: 60 cc
   Rotating speed of the main shaft: 60 rpm
   Rotor rotating ratio: 2:3
   Temperature of the chamber: 170° C.
The time which ran from the starting of rotation to the coloration of a Congo red test paper wetted with glycerol and located 3 cm above the feed opening of the chamber by hydrogen chloride gas generated by decomposition was measured, (the decomposition time), and made a measure of dynamic heat stability. Materials having a decomposition time of not more than 15 minutes are likely to undergo decomposition depending upon the molding conditions and are therefore undesirable.

Softening temperature

In accordance with JIS K-6745, the softening temperature of a hard vinyl chloride resin plate was measured. A material having a softening temperature of less than 45° C. deforms by slight changes in temperature after molding, and is undesirable.

Dispersibility of carbon black

A piece, 1 μm thick, was prepared by a microtome from a plate press-formed from the composition, and its photograph was taken through an optical microscope (the transmitting method) at a magnification of 200 X. The number and size of agglomerated masses of carbon black present in an area of 200 ×300 μm were determined, and the results are rated A, B and C as follows:

A (dispersion excellent): there are not more than 20 agglomerated masses having a maximum size of more than 5 μm, and there is no agglomerated mass having a maximum size of more than 20 μm.

B (dispersion good): there are not more than 20 agglomerated masses having a maximum size of 5 to 30 μm.

C (dispersion poor): there are more than 20 agglomerates masses having a maximum size of more than 5 μm.

Volume resistivity

A rod-like extrudate having a diameter of 4 mm was cut to a length of 7.5 cm. The length of the sample was measured by a slide caliper, and its diameter, by a micrometer. Then, both ends of the sample were coated with a silver paint, and the resistance value across the two ends of the sample was measured by a tester, and the volume resistivity of the sample was calculated in accordance with the following equation.

$$\text{Volume resistivity (ohms-cm)} = \text{Resistance (ohms)} \times \frac{\pi \times [\text{diameter 9cm}]^2}{4 \times \text{length (cm)}}$$

The samples used in the above measuring methods were prepared as follows.

The polymer, carbon black, a stabilizer and if desired a slip agent and a plasticizer were charged into a high-speed agitator, and were fully stirred. A part of the resulting powdery composition was extrusion-molded into pellets by an extruder set at a temperature of 170° C. The resulting pellets were used as test samples for dynamic heat stability and melt viscosity. Another portion of the powdery composition was extrusion-molded into a rod-like shape having a diameter of 4 mm to give samples for measurement of volume resistivity and for observation of surface texture. The remainder of the powdery composition was extruded by the above extruder, and immediately then, pressed into plates by a press former kept at 175° C. for 5 minutes under a pressure of 130 kg/cm$^2$. The plates were used as test samples for measurement of volume resistivity, softening temperature and dispersibility of carbon black.

EXAMPLE 1

A composition was prepared in accordance with the following compounding recipe, and its various properties were measured. The results are shown in Table 1.

| Recipe | |
|---|---|
| Polymer (composed of the monomer components shown in Table 1) | 100 (parts by weight) |
| Dioctyltin maleate | 2.0 |
| Dibutyltin dilaurate | 0.5 |
| Epoxidized soybean oil | 0.5 |
| Slip agent | 2.0 |
| Ketjen Black EC (a product of Akzo Chemie; oil absorption 355 ml/100g, surface area 1000 m$^2$/g) | 20 |

TABLE 1

| | | Run No. | | | | | |
|---|---|---|---|---|---|---|---|
| | | Invention | | | Comparison | | |
| | | 1 | 2 | 3 | 1 | 2 | 3 |
| Monomer components (wt. %) | Vinyl chloride | 98 | 90 | 92 | 100 | 77 | 90 |
| | Ethylene | 2 | 5 | 8 | — | 5 | — |
| | Vinyl acetate | — | 5 | — | — | 18 | 10 |
| Specific viscosity of the polymer | | 0.206 | 0.182 | 0.183 | 0.305 | 0.145 | 0.200 |
| Dynamic heat stability (min.) | | 37 | 26 | 36 | 36 | 8 | 4 |
| Softening temperature (°C.) | | 57 | 49 | 52 | 85 | 41 | 67 |
| Volume resistivity (ohms-cm) | | 3.9 | 3.3 | 3.1 | 67.2 | 3.8 | 4.2 |
| Carbon black dispersibility | | B | A | A | C | C | C |
| Surface condition | | Good | Excellent | Excellent | Poor | Poor | Poor |

EXAMPLE 2

Example 1 was repeated except that a copolymer having a specific viscosity of 0.192 and composed of 95% by weight of vinyl chloride, and 5% by weight of ethylene was used in accordance with the compounding recipes shown in Table 2. The results are shown in Table 2.

TABLE 2

| | Run No. | | | | | | | |
|---|---|---|---|---|---|---|---|---|
| | Invention | | | | | Comparison | | |
| | 4 | 5 | 6 | 7 | 8 | 4 | 5 | 6 |
| Copolymer | 100 | | | | | 100 | | |
| Carbon black | 15 | 20 | 30 | 20 | 20 | 12 | 35 | 20 |

TABLE 2-continued

| | Run No. | | | | | | | |
|---|---|---|---|---|---|---|---|---|
| | Invention | | | | | Comparison | | |
| | 4 | 5 | 6 | 7 | 8 | 4 | 5 | 6 |
| Dioctyltin maleate | | | 2.0 | | | 2.0 | | |
| Dibutyltin laurate | | | 0.5 | | | 0.5 | | |
| Epoxidized soybean oil | | | 0.5 | | | 0.5 | | |
| Slip agent | | | 2.0 | | | 2.0 | | |
| Carbon oil absorption (ml/100g) | | 355 | | 325 | 390 | 355 | 355 | 340 |
| black Surface area (m²/g) | | | 1000 | | | 1000 | 1000 | 64 |
| Dynamic heat stability (min.) | 43 | 36 | 25 | 41 | 29 | 45 | 18 | 39 |
| Softening temperature (°C.) | 51 | 54 | 60 | 53 | 54 | 50 | 63 | 53 |
| Volume resistivity (ohms-cm) | 34 | 4.3 | 1.6 | 9.8 | 3.7 | $2 \times 10^2$ | 1.1 | $7 \times 10^5$ |
| Carbon dispersibility | B | A | A | A | A | C | C | A |
| Surface condition | Good | Excellent | Excellent | Excellent | Excellent | Poor | Poor | Good |

EXAMPLE 3

Example 1 was repeated except that a polymer mixture consisting of 70 parts by weight of the polymer in Run No. 3 (invention) shown in Table 1 and 30 parts by weight of the polymer used in Comparison 1 in Table 1 was used. The results are shown below.

Dynamic heat stability: 36 minutes
  Softening temperature: 62° C.
  Volume resistivity: 12.5 ohms-cm
  Carbon disperbisibility: B
  Surface condition: Good

What we claim is:

1. A hard vinyl chloride resin composition for information signal recording media, said composition consisting essentially of
  (A) 100 parts by weight of a copolymer having a specific viscosity of 0.16 to 0.31 and composed of 75 to 99% by weight of vinyl chloride, 1 to 10% by weight of ethylene and 0 to 15% by weight of another monomer copolymerizable with said monomers, and/or a polymer mixture having a specific viscosity of 0.16 to 0.31 and composed of at least two polymers selected so that the proportions of monomer components are the same as above, and
  (B) 15 to 30 parts by weight of carbon black having an oil absorption of 300 to 400 ml/100 g and a surface area of at least 900 m²/g.

2. The composition of claim 1 wherein the copolymer or polymer mixture (A) consists of 87 to 98% by weight of vinyl chloride, 2 to 8% by weight of ethylene and 0 to 5% by weight of the other monomer.

3. The composition of claim 1 or claim 2 wherein (A) comprises a polymer mixture of a vinyl chloride homopolymer and a vinyl chloride/ethylene copolymer.

* * * * *